US010903027B2

(12) United States Patent
Kitamura et al.

(10) Patent No.: US 10,903,027 B2
(45) Date of Patent: Jan. 26, 2021

(54) KEYBOARD DEVICE AND ELECTRONIC APPARATUS

(71) Applicant: LENOVO (SINGAPORE) PTE. LTD., Singapore (SG)

(72) Inventors: Masahiro Kitamura, Yokohama (JP); Satoshi Douzono, Yokohama (JP); Kazumi Nakaju, Yokohama (JP); Takanori Koike, Yokohama (JP)

(73) Assignee: LENOVO (SINGAPORE) PTE. LTD., Singapore (SG)

( * ) Notice: Subject to any disclaimer, the term of this patent is extended or adjusted under 35 U.S.C. 154(b) by 0 days.

(21) Appl. No.: 16/532,172

(22) Filed: Aug. 5, 2019

(65) Prior Publication Data

US 2020/0388450 A1    Dec. 10, 2020

(30) Foreign Application Priority Data

Jun. 6, 2019  (JP) .................................. 2019-106065

(51) Int. Cl.
*H01H 13/86*      (2006.01)
*G06F 1/16*       (2006.01)
*H01H 13/7057*    (2006.01)

(52) U.S. Cl.
CPC ............ *H01H 13/86* (2013.01); *G06F 1/169* (2013.01); *G06F 1/1662* (2013.01); *H01H 13/7057* (2013.01)

(58) Field of Classification Search
CPC ..................................................... H01H 13/86
USPC ......................................................... 400/472
See application file for complete search history.

(56) References Cited

U.S. PATENT DOCUMENTS

| 9,497,874 | B2 * | 11/2016 | Takita | H05K 5/069 |
| 2002/0025209 | A1 * | 2/2002 | Kashino | H01H 25/041 |
| | | | | 400/472 |
| 2003/0072596 | A1 * | 4/2003 | Horiuchi | H01H 13/7006 |
| | | | | 400/492 |
| 2008/0006516 | A1 * | 1/2008 | Nishino | H01H 13/702 |
| | | | | 200/345 |
| 2009/0091478 | A1 * | 4/2009 | Chan | G05G 1/02 |
| | | | | 341/22 |
| 2009/0174994 | A1 * | 7/2009 | Merz | G06F 3/0202 |
| | | | | 361/679.09 |
| 2009/0279238 | A1 * | 11/2009 | Kobayashi | G06F 1/1637 |
| | | | | 361/679.09 |
| 2011/0048908 | A1 * | 3/2011 | Nishino | H01H 13/83 |
| | | | | 200/314 |
| 2014/0138230 | A1 * | 5/2014 | Chen | H03K 17/98 |
| | | | | 200/5 A |
| 2015/0179358 | A1 * | 6/2015 | Nakatani | H01H 3/12 |
| | | | | 200/5 A |

FOREIGN PATENT DOCUMENTS

JP    2019-008761 A    1/2019

* cited by examiner

*Primary Examiner* — Anthony H Nguyen
(74) *Attorney, Agent, or Firm* — Shimokaji IP (57) ABSTRACT

A keyboard device is provided with a base plate, a plurality of key tops, a membrane sheet, and a frame. The frame has a frame portion interposed between the key tops adjacent to each other and partitions each key top in a vertically movable state by the formation of a gap between the side surface of the frame portion and the side surface of the key top. The base plate has a notch portion at a position at least overlapping with a portion under the gap.

10 Claims, 7 Drawing Sheets

KEYBOARD DEVICE AND ELECTRONIC APPARATUS

FIELD OF THE INVENTION

The present invention relates to a keyboard device and an electronic apparatus provided with the keyboard device.

BACKGROUND OF THE INVENTION

An electronic apparatus, such as a Laptop PC, is usually provided with a keyboard device on the upper surface of a chassis. This kind of keyboard device has been demanded to reduce gaps between key tops as much as possible in order to prevent the entering of dust and dirt, for example, into the chassis while securing the appearance quality. In order to satisfy such a demand, an isolation structure in which adjacent key tops are partitioned by a frame has also been widely utilized (for example, see Japanese Patent No. 6412626).

SUMMARY OF THE INVENTION

The keyboard device described above has a configuration of having a base plate serving as a mounting plate of the key tops and the like and a switch sheet (membrane sheet) laminated thereon. In a common keyboard device, key tops, a frame, and a membrane sheet are uniformly colored black, for example. Meanwhile, a base plate has a color (for example, silver) of a material itself, such as stainless steel. Therefore, when an opening portion and the like formed in the membrane sheet, for example, are disposed under gaps between the key tops adjacent to each other or between the adjacent key tops and the frame, the base plate is seen from the gaps. Thus, the silver base plate is conspicuous in the appearance of the keyboard device which is entirely uniformly colored black, which reduces the appearance quality.

The present invention has been made in consideration of the problem of the conventional technique described above. It is an object of the present invention to provide a keyboard device capable of suppressing a reduction in appearance quality and an electronic apparatus provided with the keyboard device.

A keyboard device according to a first aspect of the present invention is a keyboard device provided with a base plate, a plurality of key tops vertically movably supported on the side of the upper surface of the base plate and provided to be arranged in the front and rear direction and the right and left direction, a membrane sheet provided between the base plate and the key tops and configured to detect a depressing operation of the key top, and a frame provided above the membrane sheet, having a frame portion interposed between the key tops adjacent to each other, and partitioning each key top in a vertically movable state by the formation of a gap between the side surface of the frame portion and the side surface of the key top, in which the base plate has a notch portion at a position at least overlapping with a portion under the gap.

A configuration may be acceptable in which the membrane sheet covers the notch portion.

A configuration may be acceptable in which a projection portion disposed under the frame portion and projecting upward through an opening portion formed in the membrane sheet is provided in the upper surface of the base plate and the notch portion is formed in a part of an outer peripheral edge portion of the projection portion.

A configuration may be acceptable in which the projection portion has a dish shape in which the base plate is bulged upward in a circle and a portion in which a part of an outer peripheral edge portion of the circle is cut out configures the notch portion.

A configuration may be acceptable in which a through-hole penetrating in the plate thickness direction is provided in the center of the projection portion and a component disposed on the side of the lower surface of the base plate and the base plate are fixed by a fastening tool passing through the through-hole.

A configuration may be acceptable in which a pointing stick which is provided on the side of the upper surface of the base plate and the periphery of which is surrounded by the plurality of key tops is further provided, the component is a bracket member supporting the pointing stick, and the fastening tool is attached so as to penetrate the base plate from the side of the upper surface to the side of the lower surface and fixes the bracket member to the lower surface of the base plate.

A keyboard device according to a second aspect of the present invention is a keyboard device provided with a base plate, a plurality of key tops vertically movably supported on the side of the upper surface of the base plate and provided to be arranged in the front and rear direction and the right and left direction, and a membrane sheet provided between the base plate and the key tops and configured to detect a depressing operation of the key top, in which a gap is formed between the key tops and the base plate has a notch portion at a position at least overlapping with a portion under the gap.

A configuration may be acceptable in which the membrane sheet covers the notch portion.

A configuration may be acceptable in which a projection portion projecting upward through an opening portion formed in the membrane sheet is provided in the upper surface of the base plate, in the projection portion, a through-hole penetrating in the plate thickness direction is provided and a fastening tool passing through the through-hole fixes a component disposed on the side of the lower surface of the base plate to the base plate, and the projection portion is provided in such a manner that an outer peripheral edge portion thereof projects outward relative to the outer periphery of a head portion of the fastening tool and the notch portion is formed in a part of the outer peripheral edge portion.

An electronic apparatus according to a third aspect of the present invention is provided with the keyboard device of the above-described configuration, a main body chassis provided with the keyboard device, and a display chassis rotatably coupled to the main body chassis and having a display.

The above-described aspects of the present invention can suppress a reduction in appearance quality of the keyboard device.

DETAILED DESCRIPTION OF THE INVENTION

Hereinafter, a keyboard device and an electronic apparatus according to an aspect of the present invention are described in detail with reference to the attached drawings giving preferable embodiments.

Figure 1:
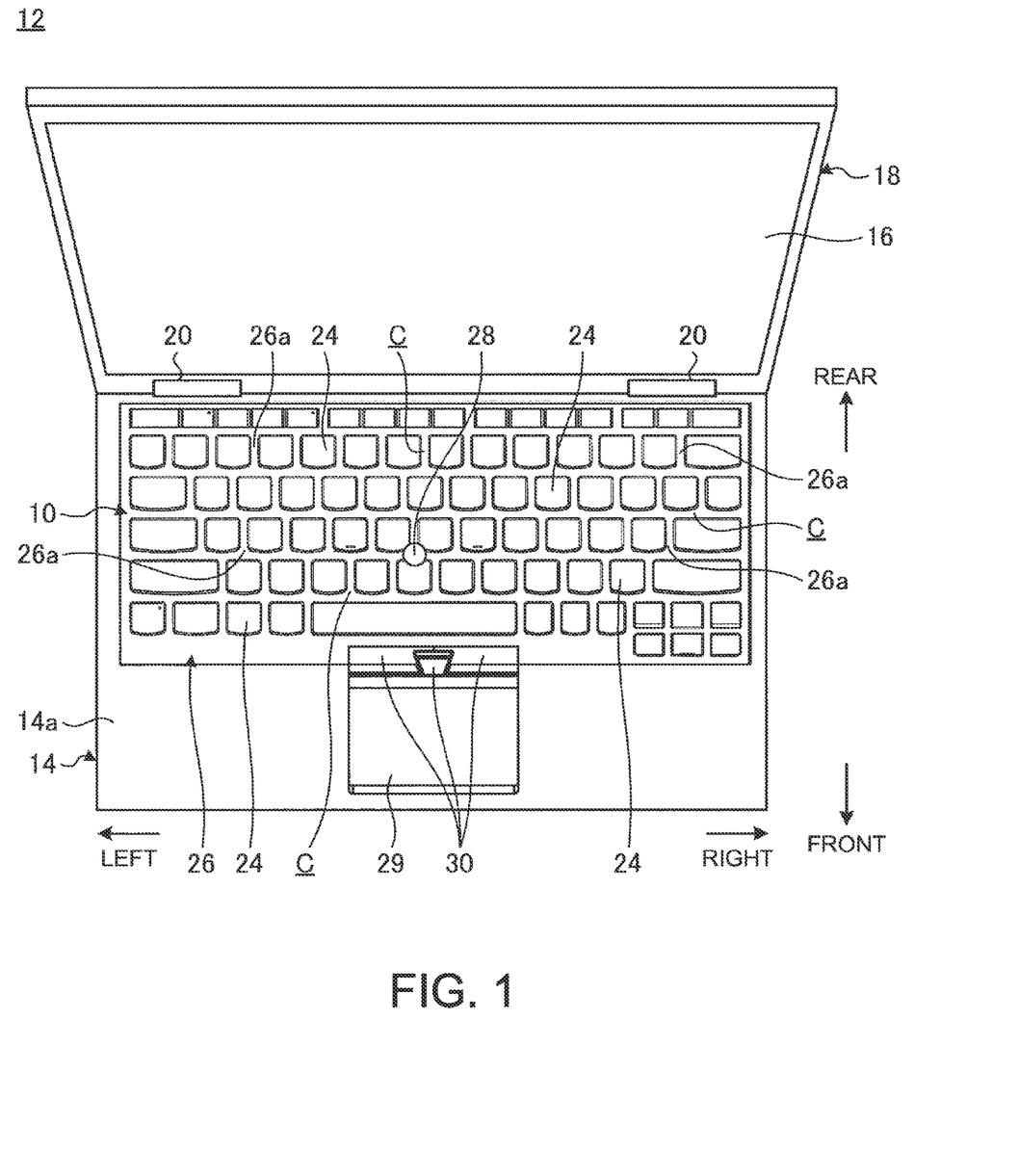
FIG. 1 is a plan view of an electronic apparatus provided with a keyboard device according to one embodiment.

FIG. 1 is a plan view of an electronic apparatus 12 provided with a keyboard device 10 according to one embodiment. The electronic apparatus 12 is a Laptop PC in which a main body chassis 14 mounting the keyboard device 10 and a display chassis 18 mounting a display 16 are rotatably coupled with hinges 20. FIG. 1 is a plan view in a state where the display chassis 18 is opened from the main body chassis 14 to be brought into a use form. The keyboard device 10 may be mounted in an electronic apparatus other than the Laptop PC. The keyboard device 10 may be an external keyboard device for use in a desktop PC, for example.

Hereinafter, the keyboard device 10 is described referring to the front side as "front", the deep side as "rear", the thickness direction as "top and bottom", and the width direction as "right and left" based on a state where the keyboard device 10 mounted in the electronic apparatus 12 as illustrated in FIG. 1 is viewed from a user using the same.

The display chassis 18 is a thin box-shaped chassis and provided with the display 16 containing a liquid crystal display, for example. In the display chassis 18, a lower end portion thereof is coupled to a rear end portion of the main body chassis 14 through the hinges 20.

The main body chassis 14 is a thin box-shaped chassis thicker than the display chassis 18. Inside the main body chassis 14, a substrate, such as a motherboard, various kinds of electronic components, such as an arithmetic unit and a memory, mounted in the substrate, a battery device, a cooling device, and the like are housed.

The keyboard device 10 is provided on the upper surface of the main body chassis 14. The keyboard device 10 is provided with a plurality of key tops 24 disposed to be arranged in the front and rear direction and the right and left direction. The key tops 24 are black, for example. In the key tops 24, a gap C1 between adjacent side surfaces 24a, 24a is filled with a frame 26. In the keyboard device 10 of this embodiment, the key tops 24 adjacent to each other are partitioned by frame portions 26a of the frame 26. More specifically, the keyboard device 10 has an isolation structure having a configuration in which the key tops 24 are individually independent. The frame portions 26a form a plurality of hole portions into which the key tops 24 are vertically movably inserted, respectively, and extend in a mesh shape along the front and rear direction and the right and left direction. The frame 26 may be integrally molded with a cover member 14a forming the upper surface of the main body chassis 14. The frame 26 may be configured separately from the cover member 14a. The frame 26 has the same color as that of the key tops 24 and is black in this embodiment.

The keyboard device 10 has a pointing stick 28 substantially in the center. The pointing stick 28 is an input device for operating a cursor (mouse pointer) displayed on the display 16 and can be operated as a substitute for a mouse. On the front of the keyboard device 10, a touchpad 29 is provided. The touchpad 29 is an input device for operating the cursor (mouse pointer) displayed on the display 16. On the rear of the touchpad 29, three push buttons 30 functioning in coordination with the cursor operation by the pointing stick 28 or the touchpad 29 are provided.

Figure 2:
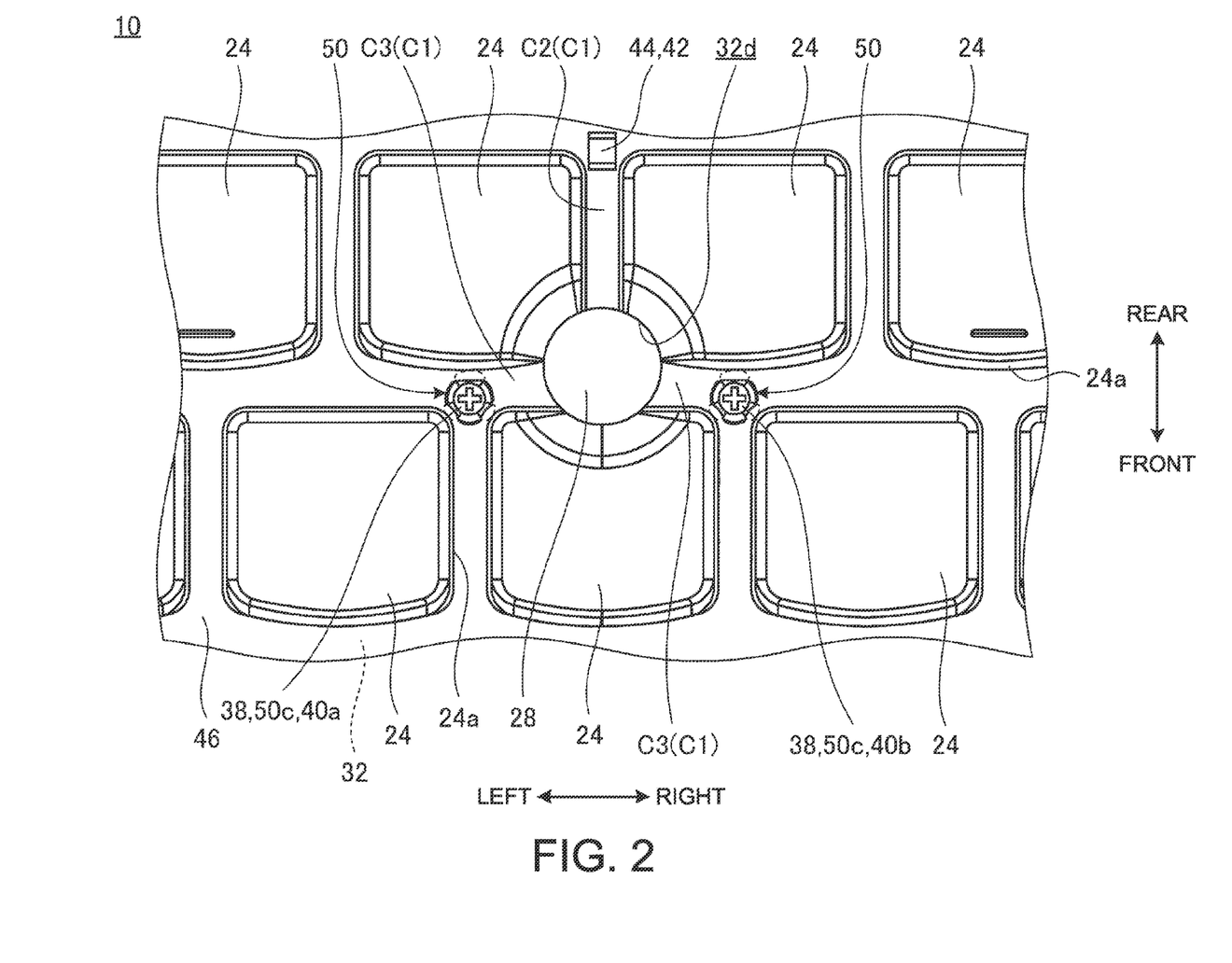
FIG. 2 is a plan view in which a pointing stick and a peripheral portion thereof of the keyboard device are enlarged and a frame is omitted.
Figure 3:
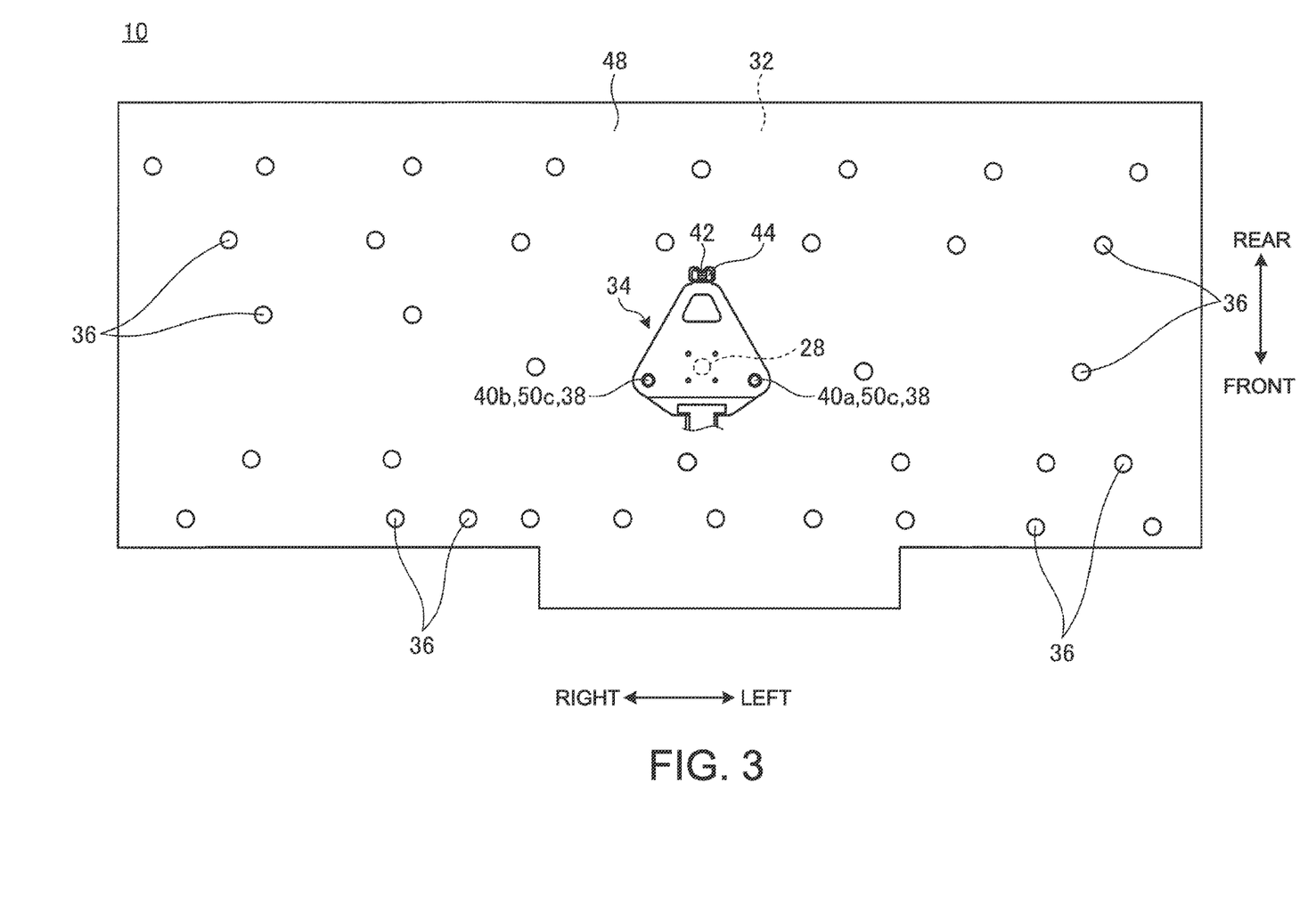
FIG. 3 is a schematic bottom view of the keyboard device.

FIG. 2 is a plan view in which the pointing stick 28 and a peripheral portion thereof of the keyboard device 10 are enlarged and the frame 26 is omitted. FIG. 3 is a schematic bottom view of the keyboard device 10.

As illustrated in FIG. 2, the pointing stick 28 is a circular member as viewed in plan. The pointing stick 28 is disposed at a position where a portion (gap C2) extending in the front and rear direction and a portion (gap C3) extending in the right and left direction of the gaps C1 between the key tops 24 cross each other, for example. The gap C2 is a space formed between one pair of right and left key tops 24, 24, for example. The gap C3 is a space formed between the front and rear key tops 24, 24. Therefore, the pointing stick 28 of this embodiment is disposed at a position where the gaps C1 cross each other in a T shape and disposed at positions where parts of the surrounding three key tops 24 are notched in a circle. The arrangement of the pointing stick 28 can be altered as appropriate.

Figure 5:
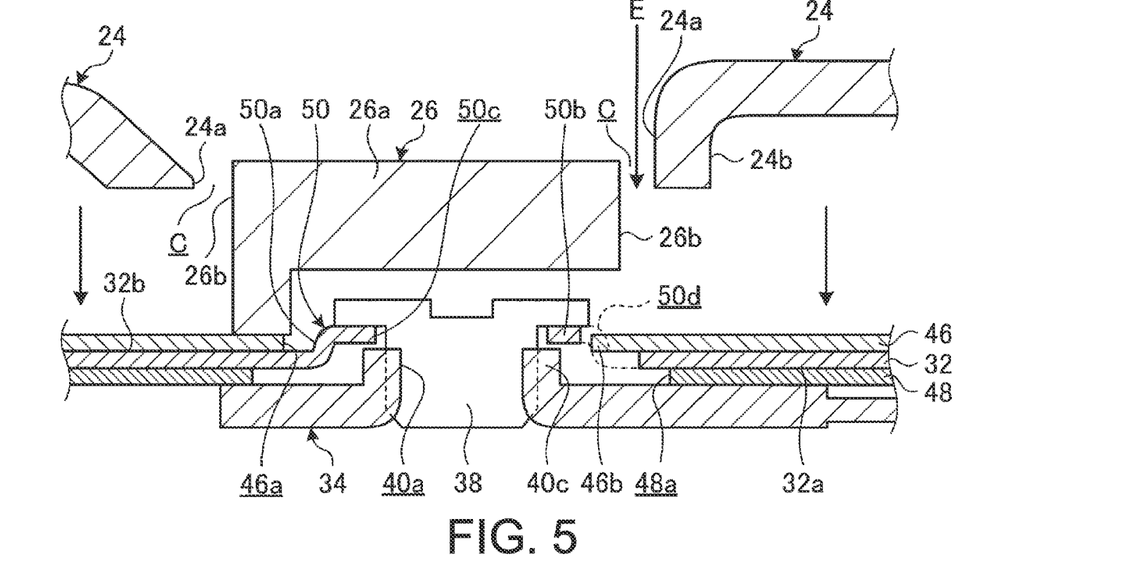
FIG. 5 is a side surface cross-sectional view schematically illustrating the configuration of the screw and the peripheral portion thereof illustrated in FIG. 4.

As illustrated in FIGS. 2, 3 and 5, the keyboard device 10 has a base plate 32 serving as a mounting plate of the key tops 24. To a lower surface 32a of the base plate 32, a bracket member 34 is attached. The pointing stick 28 is supported on the upper surface of the bracket member 34 and projects upward from an upper surface 32b of the base plate 32. As illustrated in FIG. 3, the base plate 32 is screw-fixed to the frame 26 with attachment screws 36 penetrating various places in the plate thickness direction.

The bracket member 34 is attached to the base plate 32 with two screws 38 and an engagement portion 44. The screws 38 fasten the bracket member 34 to the base plate 32 through one pair of right and left mounting holes 40a, 40b provided in the bracket member 34. The engagement portion 44 is engaged with a portion to be engaged 42 formed in the base plate 32. The screws 38 have the same color as that of the key tops 24 or the frame 26 and are black in this embodiment.

Figure 4:
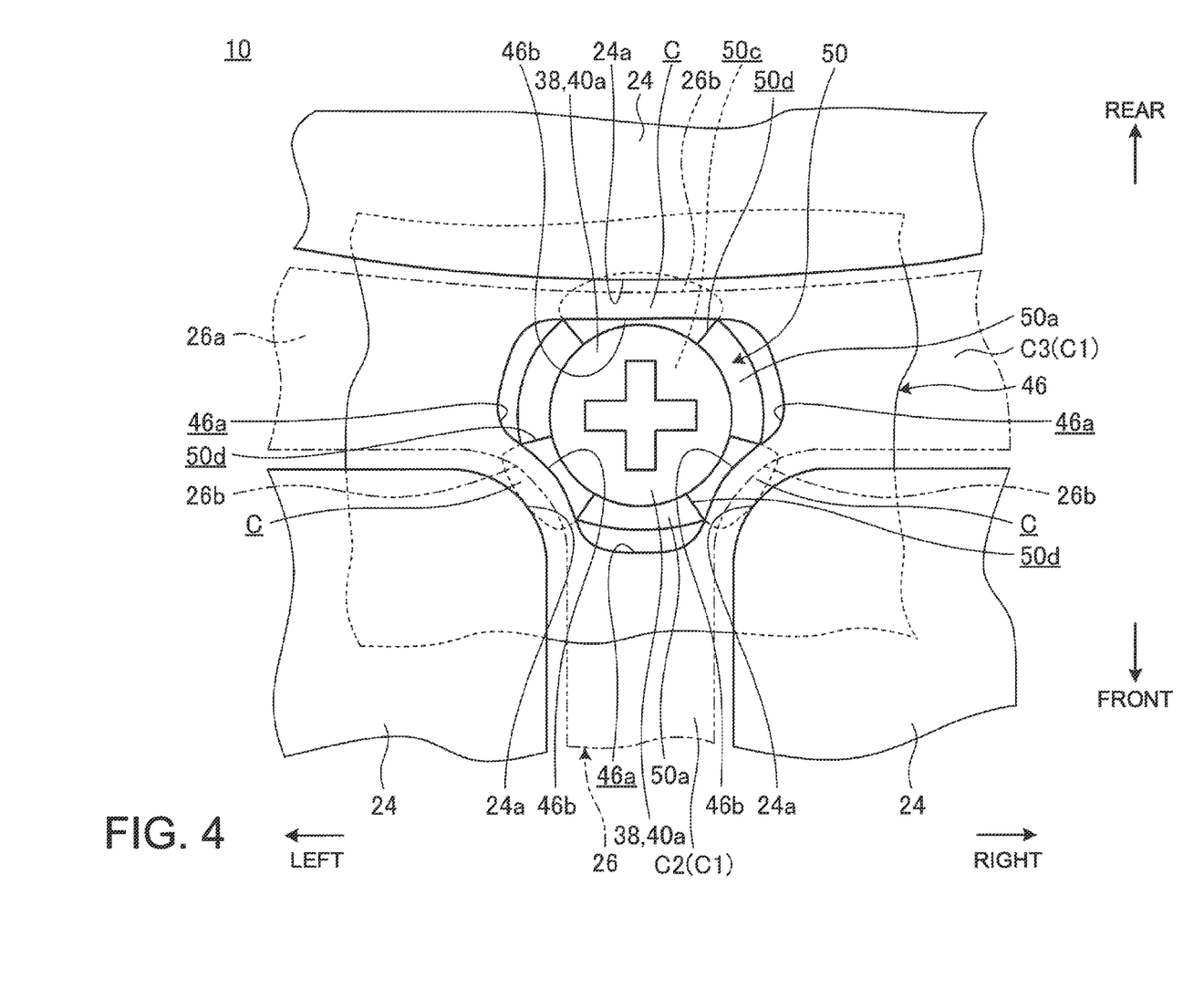
FIG. 4 is a plan view in which one mounting hole and a screw and a peripheral portion thereof in FIG. 2 are enlarged.

FIG. 4 is a plan view in which one mounting hole 40a and the screw 38 and a peripheral portion thereof in FIG. 2 are enlarged and illustrating the frame 26 by the chain double-dashed line. FIG. 5 is a side surface cross-sectional view schematically illustrating the configuration of the screw 38 and the peripheral portion thereof illustrated in FIG. 4. Although FIGS. 4 and 5 representatively illustrate the configuration of one mounting hole 40a and the peripheral portion thereof, the other mounting hole 40b and a peripheral portion thereof also have the same configuration.

As illustrated in FIG. 5, the keyboard device 10 is provided with a support plate of a three-layer structure in which the base plate 32, a membrane sheet 46, and a light guide plate 48 are laminated. The support plate may have a structure other than the three-layer structure.

The base plate 32 is obtained by applying lancing molding or punch molding to a metal plate, such as a thin stainless plate or aluminum plate. The base plate 32 serves as a mounting plate of the key tops 24 and the bracket member 34 (pointing stick 28). The base plate 32 has a color of a metal material itself, such as stainless steel, and is substantially silver in this embodiment.

The membrane sheet 46 is laminated on the upper surface 32b of the base plate 32. The membrane sheet 46 is a switch sheet of a three-layer structure in which contact points are closed when pressed, for example. In the membrane sheet 46, when a position where a fixed contact and a movable contact overlap with each other is pressed, the fixed contact and the movable contact are brought into close contact with each other, whereby the contact points are closed. The membrane sheet 46 may have a structure using a contact switch in which a rubber conductive portion short-circuiting a circuit and the like, for example, other than the three-layer structure. The membrane sheet 46 has through-holes in various places. The key tops 24 are attached to the upper surface 32b of the base plate 32 through a pantograph mechanism or the like which is not illustrated passing through the through-holes. Thus, the key top 24 vertically moves on the upper surface 32b side of the base plate 32 and, when moving down, turns on a switch of the membrane sheet 46 through a rubber dome which is not illustrated. The membrane sheet 46 has the same color as that of the key tops 24 or the frame 26 and is black in this embodiment.

The light guide plate 48 is laminated on the lower surface 32a of the base plate 32. The light guide plate 48 guides light emitted from a light source, such as an LED element, and then reflects the light to thereby irradiate each key top 24 with the light from the lower surface side. A waterproof sheet may be provided in place of the light guide plate 48.

As illustrated in FIGS. 3 and 5, the bracket member 34 is fixed to the lower surface 32a side of the base plate 32. The bracket member 34 is a metal plate, such as a thin stainless plate or aluminum plate, and has a substantially bell shape formed to have a narrow width toward the rear as viewed in plan.

The mounting holes 40a, 40b are provided in front left and right corner portions, respectively, of the bracket member 34 and are arranged in the right and left direction. In the periphery of the mounting hole 40a (40b), a cylindrical portion 40c erected upward is formed (see FIG. 5). The cylindrical portion 40c is formed by barring processing or the like from the lower surface to the upper surface of the bracket member 34, for example. The mounting holes 40a, 40b are formed so as to penetrate the cylindrical portions 40c and a female screw into which a screw 38 can be screwed is formed in the inner peripheral surface of each of the mounting holes 40a, 40b. The engagement portion 44 is provided in a rear edge portion formed to be tapered of the bracket member 34. The engagement portion 44 is a plate piece engaged with the portion to be engaged 42 (see FIG. 6) formed by lancing on the lower surface 32a side of the base plate 32.

The pointing stick 28 is erected through a sensor substrate which is not illustrated on the upper surface of the bracket member 34. The pointing stick 28 projects upward relative to the upper surface 32b through a stick insertion hole 32d (see FIG. 6) formed to penetrate in the base plate 32. The sensor substrate is a control substrate of the pointing stick 28 and detects an operation load to an input operation in the horizontal directions (front and rear, right and left, and oblique directions) to the pointing stick 28.

Figure 6:
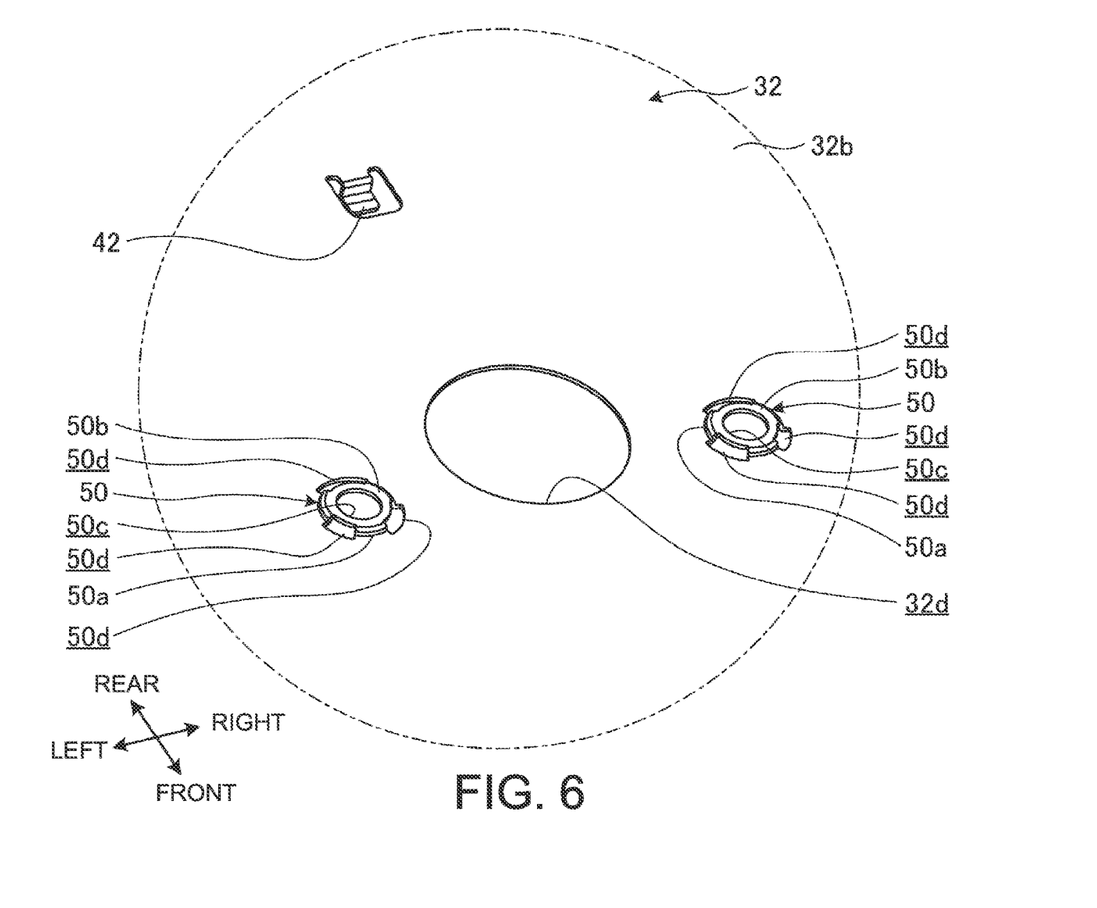
FIG. 6 is a perspective view in which a base plate is viewed from the upper surface side.
Figure 7:
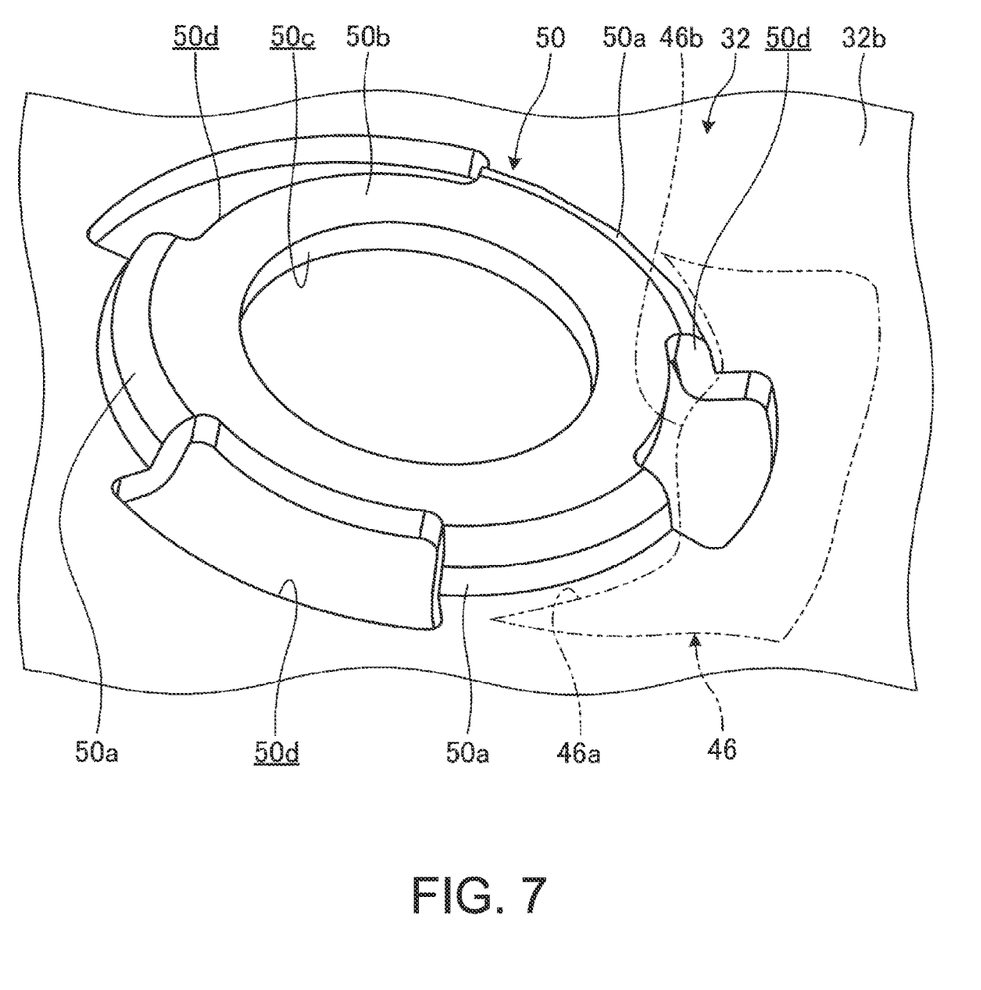
FIG. 7 is an enlarged view of a projection portion illustrated in FIG. 6.

FIG. 6 is a perspective view in which the base plate 32 is viewed from the upper surface 32b side and is a figure in which the stick insertion hole 32d and a peripheral portion thereof are enlarged. FIG. 7 is an enlarged view of a projection portion 50 illustrated in FIG. 6.

As illustrated in FIGS. 4 to 7, the base plate 32 has the projection portion 50 at a position overlapping with the mounting hole 40a (40b). The projection portion 50 has a dish shape in which the base plate 32 is bulged upward in a circle. The projection portion 50 projects from the upper surface 32b of the base plate 32 and passes through an opening portion 46a formed in the membrane sheet 46. An upper portion of the projection portion 50 is located above the upper surface of the membrane sheet 46 (see FIG. 5). The projection portion 50 has an outer peripheral edge portion 50a, a disk portion 50b, a through-hole 50c, and notch portions 50d.

The outer peripheral edge portion 50a is a side wall portion in a tapered shape in which the diameter gradually reduces upward from the upper surface 30b. The outer peripheral edge portion 50a is formed by press-molding the base plate 32 from the lower surface 32a side toward the upper surface 32b side, for example. The outer peripheral edge portion 50a is a circle continuous in the circumferential direction, for example, in the molding thereof, and is formed into a shape in which parts of the outer peripheral edge portion 50a are cut out by the notch portions 50d by the subsequent process. More specifically, the outer peripheral edge portion 50a has a circular outer shape track as a whole and parts (three places in this embodiment) thereof are cut out and divided by the notch portions 50d. The outer peripheral edge portion 50a and the notch portions 50d may be simultaneously molded.

The disk portion 50b is a plate portion closing an upper portion of the outer peripheral edge portion 50a and forms a dish-shaped bottom surface. The disk portion 50b of this embodiment is located above the upper surface 32b of the base plate 32 or the upper surface of the membrane sheet 46. The through-hole 50c is a hole portion penetrating the center of the disk portion 50b.

The notch portion 50d is a portion in which a part of the outer peripheral edge portion 50a originally having a circular outer shape track is cut out in a fan shape. The notch portion 50d of this embodiment has a shape in which a part of the disk portion 50b and a part of the base plate 32 are simultaneously cut out with the part of the outer peripheral edge portion 50a. The notch portion 50d may have a shape in which only a part of the outer peripheral edge portion 50a is cut out. A part of the membrane sheet 46 (bulged portion 46b) enters the notch portion 50d. More specifically, the membrane sheet 46 covers at least parts of the notch portions 50d, specifically in a range at least overlapping with portions under gaps C in the notch portions 50d.

As illustrated in FIGS. 4 and 5, in the keyboard device 10, the gaps C are formed between the key tops 24 and the frame portions 26a of the frame 26. Specifically, the gap C is formed between the side surface 24a of the key top 24 and the side surface 26b of the frame portion 26a. The gaps C are gaps for preventing the key tops 24 from interfering with the frame portions 26a in vertically moving. The notch portion 50d is provided in a range at least overlapping with a portion under the gap C. More specifically, the notch portion 50d is obtained by cutting out the range overlapping with the portion under the gap C of the original circular-outer-shape-track of the outer peripheral edge portion 50a. Accordingly, in the projection portion 50, the outer peripheral edge portion 50a is disposed in a portion hidden under the frame 26 and the notch portion 50d is disposed in a portion not hidden under the frame 26.

As described above, the keyboard device 10 of this embodiment is structured so that, when the gap C is looked from above as indicated by an arrow E in FIG. 5, the outer peripheral edge portion 50a is not seen ahead and the bulged portion 46b of the membrane sheet 46 entering the notch portion 50d is seen ahead. More specifically, in the keyboard device 10, only the membrane sheet 46 having the same color (black) as that of the key tops 24 or the frame 26 is seen from the gap C. More specifically, when the gap C is looked in the direction indicated by the arrow E in FIG. 5, the black color of the membrane sheet 46 is seen, and therefore the entire appearance is uniformly colored black, so that high appearance quality is obtained in the keyboard device 10.

In the membrane sheet 46, when the internal diameter of the opening portion 46a is tentatively designed to be substantially the same as the outer diameter of the outer peripheral edge portion 50a of the projection portion 50, there is a possibility that an edge portion thereof rides on the outer peripheral edge portion 50a. A reason therefor is manufacturing tolerance or assembly tolerance of the opening portion 46a or the projection portion 50. In this case, a portion riding on the outer peripheral edge portion 50a greatly projects upward in the membrane sheet 46. Thus, there is a concern that the membrane sheet 46 interferes with the vertical operation of the key top 24. Thus, as illustrated in FIGS. 4 and 5, the opening portion 46a of the membrane sheet 46 is formed to have a certain interval (for example, about 0.3 mm) from the outer peripheral edge portion 50a of the projection portion 50.

Therefore, in the projection portion 50 of this embodiment, the notch portion 50d is provided in the range overlapping with the portion under the gap C and the bulged portion 46b of the membrane sheet is caused to enter the notch portion 50d. Thus, the membrane sheet 46 is disposed at a position close to the screw 38 as much as possible without riding on the projection portion 50. As a result, the keyboard device 10 is structured so that, when the gap C is looked in the direction indicated by the arrow E in FIG. 5, the black color of the membrane sheet 46 is certainly seen.

Meanwhile, a state where the gap C is looked in the direction indicated by the arrow E in FIG. 5 in the case of a configuration in which the projection portion 50 does not tentatively have the notch portion 50d is considered. In this case, there is a possibility that the silver color of the base plate 32 is seen from a gap secured between the opening portion 46a and the outer peripheral edge portion 50a. Thus, the silver color of the base plate 32 is conspicuous in the gap C between the key top 24 and the frame 26 which are all uniformly colored black, which reduces the appearance quality of the keyboard device 10.

When the bracket member 34 located under the notch portion 50d is the same color as or a similar color to that of the key tops 24 or the frame 26, the membrane sheet 46 may have a structure of not having the bulged portion 46b. In this case, the bracket member 34 is exposed through the notch portion 50d and an opening portion 48a of the light guide plate 48 under the gap C. Therefore, the silver color of the base plate 32 is not conspicuous from the gap C. Moreover, also when the light guide plate 48 or a waterproof sheet in place thereof has the same color as or a similar color to that of the key tops 24 or the frame 26, the membrane sheet 46 may have a structure of not having the bulged portion 46b. In this case, the opening portion 48a is not provided in the light guide plate 48 and the light guide plate 48 or the like is disposed under the notch portion 50d, whereby a reduction in appearance quality can be suppressed.

Figure 8:
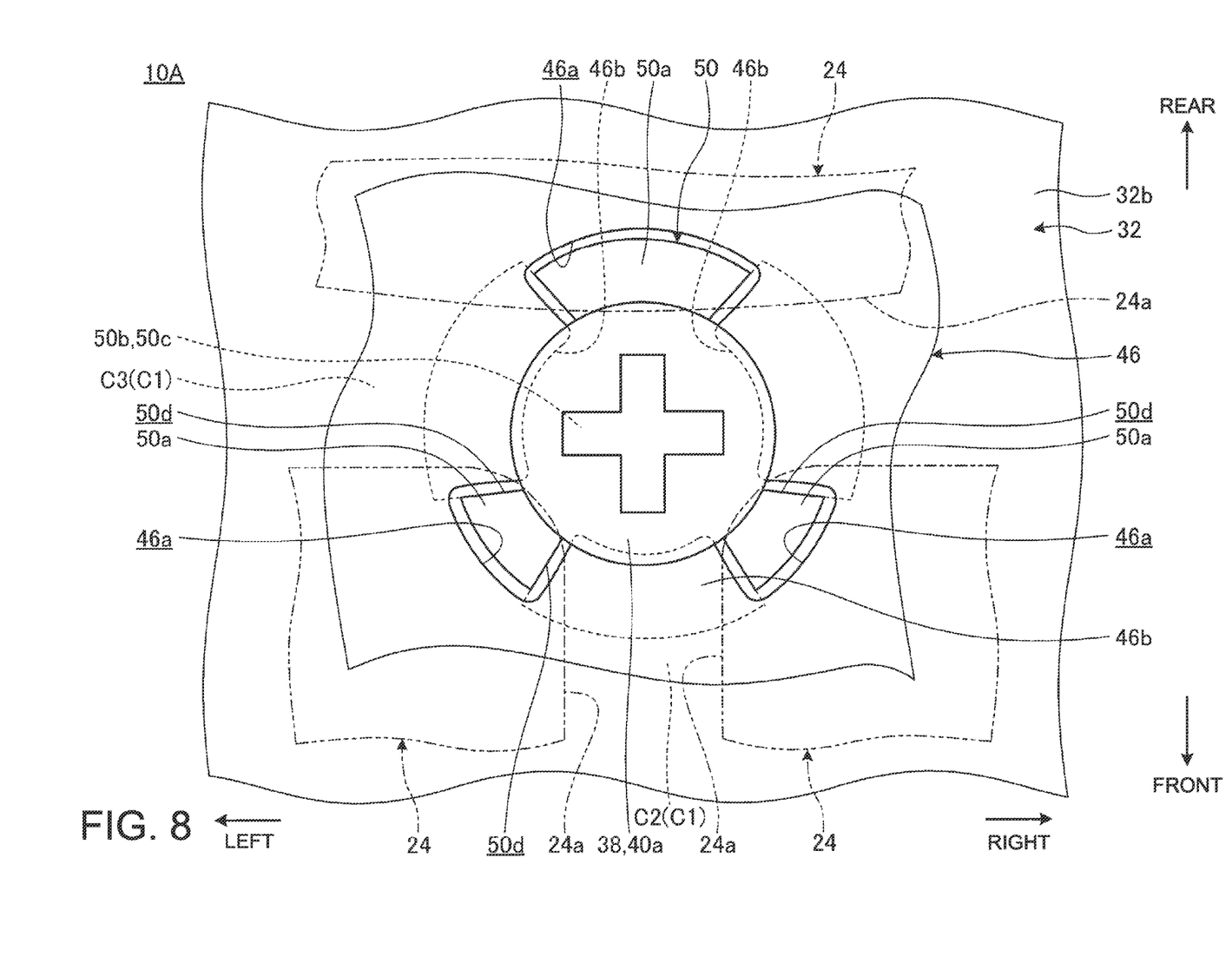
FIG. 8 is a plan view in which a mounting hole and a screw and a peripheral portion thereof in a keyboard device according to a modification are enlarged.

FIG. 8 is a plan view in which the mounting hole 40a and the screw 38 and a peripheral portion thereof in a keyboard device 10A according to a modification are enlarged. In FIG. 8, the same reference numerals as the reference numerals illustrated in FIGS. 1 to 7 indicate the same or similar configurations. Therefore, a detailed description thereof is omitted because the same or similar functions and effects are exhibited.

As illustrated in FIG. 8, the keyboard device 10A has substantially the same configuration as that of the keyboard device 10 described above except not having the frame 26. The projection portion 50 of the keyboard device 10A has a configuration in which the outer peripheral edge portion 50a is provided at a position overlapping with a portion under each key top 24 and the notch portions 50d are provided at positions overlapping with the gaps C1 between the side surfaces 24a, 24a of the key tops 24. In the projection portion 50, the outer peripheral edge portion 50a projects outward relative to a head portion of the screw 38. In the projection portion 50, the disk portion 50b has an outer diameter smaller than that of the head portion of the screw 38.

Accordingly, in the keyboard device 10A, only the screw 38 and the bulged portion 46b of the membrane sheet 46 entering the notch portion 50d are exposed to the gap C1 between the key tops 24. Therefore, also in the keyboard device 10A, the silver color of the base plate 32 is not exposed in the appearance, so that high appearance quality can be secured.

In the keyboard device 10A, a part of the projection portion 50 or a part of the screw 38 is located under each key top 24. Thus, in the key top 24, a part of a side wall 24b (see FIG. 5) configuring the side surface 24a thereof, i.e., a portion overlapping with the projection portion 50 or the screw 38, may be cut out. Thus, the key top 24 can be more certainly prevented from interfering with the projection portion 50 or the screw 38.

As described above, in the keyboard device 10 according to this embodiment, the projection portion 50 formed in the upper surface 32b of the base plate 32 has the notch portions 50d having the shape in which parts of the outer peripheral edge portion 50a are cut out in the portions overlapping with the portions under the gaps C. Moreover, in the keyboard device 10A, the projection portion 50 has the notch portions 50d having the shape in which parts of the outer peripheral edge portion 50a are cut out in the portions overlapping with the portions under the gaps C1. Thus, in the keyboard device 10 (10A), the notch portions 50d can prevent a part of the projection portion 50 to be used for fastening of the screw 38, for example, from exposing in the appearance. Accordingly, in the keyboard device 10 (10A), the projection portion 50 of the base plate 32 is not coated with the same color as that of the key tops 24 or the membrane sheet 46. Therefore, the keyboard device 10 (10A) can unify the hue of an appearance design at a low cost and by less man-hours and can obtain high appearance quality.

The projection portion 50 may be omitted. More specifically, even in a case of a configuration in which the base plate 32 does not have the projection portion 50, there is a possibility that the base plate 32 is exposed in the appearance when the membrane sheet 46 has the opening portion 46a or the like in the position overlapping with the portion under the gap C (C1), for example. Accordingly, the notch portion 50d may be formed in a flat plate portion of the base plate 32 and may be formed at the position at least overlapping with the portion under the gap C (C1).

At this time, in the keyboard device 10 (10A), a part of the membrane sheet 46 (bulged portion 46b) is disposed in the notch portion 50d. Therefore, even when components disposed under the notch portion 50d, e.g., the light guide plate 48 or the bracket member 34, do not have the same color as or a similar color to that of the key top 24, the membrane sheet 46, or the like, high appearance quality can be secured. The projection portion 50 is difficult to be formed into a shape of avoiding only the portion under the gap C (C1) when a molding method thereof and the like are taken into consideration. More specifically, the projection portion 50 generally must be formed into a circular shape, a rectangular shape, or the like as viewed in plan. Therefore, in the keyboard device 10 (10A), the exposure of the base plate 32 from the gap C (C1) is suppressed by providing the notch portion 50d in the projection portion 50.

It is a matter of course that the present invention is not limited to the contents of disclosure described above and can be freely altered without deviating from the gist of the present invention.

The description above describes the configuration in which the projection portion 50 is a boss for fastening the screw 38 as an example. However, the projection portion 50 may be a part of a hinge for mounting the push buttons 30 or the like, for example. Other fastening tools, such as a rivet, may be used as a substitute for the screw 38. Moreover, components attached to the lower surface 32a side of the base plate 32 using fastening tools, such as the screws 38, may be components other than the bracket member 34 of the pointing stick 28 and may be antenna devices, various kinds of electronic components, and the like, for example.

The description above describes the configuration in which the screw 38 is fastened from above of the projection portion 50 as an example. However, the screw 38 may be configured to be fastened upward from the lower surface 32a side of the base plate 32. In this case, the through-hole 50c may be formed as a screw hole in the projection portion 50.

The invention claimed is:

1. A keyboard device comprising:
a base plate;
a plurality of key tops vertically movable and supported on a side of an upper surface of the base plate and arranged in a front and rear direction and a right and left direction;
a membrane sheet between the base plate and the key tops and configured to detect a depressing operation of at least one of the key tops; and
a frame above the membrane sheet, having a frame portion interposed between the key tops adjacent to each other, and partitioning each key top in a vertically movable state by formation of a gap between a respective side surface of the frame portion and a respective side surface of the key tops, wherein
the base plate has a notch portion at a position overlapping with the gap.

2. The keyboard device according to claim 1, wherein:
the membrane sheet covers the notch portion.

3. The keyboard device according to claim 1, wherein:
a projection portion, under the frame portion and projecting upward through an opening portion in the membrane sheet, is in the upper surface of the base plate, and
the notch portion is in a part of an outer peripheral edge portion of the projection portion.

4. The keyboard device according to claim 3, wherein:
the projection portion has a dish shape in which the base plate bulges upwardly in a circle and further has a portion in which a part of an outer peripheral edge portion of the circle is cut out to match the notch portion.

5. The keyboard device according to claim 3, wherein:
a center of the projection portion has a through-hole extending in a plate thickness direction, and
a component, disposed on a side of a lower surface of the base plate, and the base plate are fixed by a fastening tool passing through the through-hole.

6. The keyboard device according to claim 5 further comprising:
a pointing stick on the side of the upper surface of the base plate and having a periphery surrounded by the plurality of the key tops, wherein:
the component is a bracket member supporting the pointing stick, and
the fastening tool is attached so as to penetrate the base plate from the side of the upper surface to the side of the lower surface and fixes the bracket member to the lower surface of the base plate.

7. A keyboard device comprising:
a base plate;
a plurality of key tops vertically movable and supported on a side of an upper surface of the base plate and arranged in a front and rear direction and a right and left direction; and
a membrane sheet between the base plate and the key tops and configured to detect a depressing operation of at least one of the key tops, wherein:
a gap is formed between the key tops, and
the base plate has a notch portion at a position overlapping with the gap.

8. The keyboard device according to claim 7, wherein:
the membrane sheet covers the notch portion.

9. The keyboard device according to claim 7, wherein:
a projection portion, projecting upward through an opening portion in the membrane sheet, is in the upper surface of the base plate,
the projection portion has a through-hole extending in a plate thickness direction and a fastening tool passing through the through-hole fixes a component, disposed on a side of a lower surface of the base plate, to the base plate, and
the projection portion is configured so that an outer peripheral edge portion of the projection portion projects outward relative to an outer periphery of a head portion of the fastening tool and the notch portion is in a part of the outer peripheral edge portion.

10. An electronic apparatus comprising:
a keyboard device having:
a base plate;
a plurality of key tops vertically movable and supported on a side of an upper surface of the base plate and arranged in a front and rear direction and a right and left direction;
a membrane sheet between the base plate and the key tops and configured to detect a depressing operation of at least one of the key tops; and
a frame above the membrane sheet, having a frame portion interposed between the key tops adjacent to each other, and partitioning each key top in a vertically movable state by formation of a gap between a respective side surface of the frame portion and a respective side surface of the key tops, wherein
the base plate has a notch portion at a position overlapping with the gap,
a main body chassis with the keyboard device, and a display chassis rotatably coupled to the main body chassis and having a display.

\* \* \* \* \*